United States Patent [19]

Kaye

[11] Patent Number: 4,818,014
[45] Date of Patent: Apr. 4, 1989

[54] MOUNTING ARRANGEMENT FOR SEALING STRIPS

[75] Inventor: Randy L. Kaye, Utica, Mich.

[73] Assignee: Schlegel Corporation, Rochester, N.Y.

[21] Appl. No.: 95,351

[22] Filed: Sep. 10, 1987

[51] Int. Cl.$^4$ .............................. B60J 5/00; E60B 7/16
[52] U.S. Cl. .................................... 296/146; 296/202;
296/93; 24/691; 52/208; 29/453; 49/493
[58] Field of Search ................. 296/93, 146, 201, 202;
49/492, 493; 29/432, 520, 453; 52/208,
716–718; 24/662, 102 A, 113 MP, 96, 687, 691

[56] References Cited

U.S. PATENT DOCUMENTS

| | | | |
|---|---|---|---|
| 1,252,289 | 1/1918 | Murray, Jr. | 194/683 |
| 2,601,512 | 6/1952 | Gagnier | 20/69 |
| 2,607,965 | 8/1952 | Gagnier | 20/69 |
| 2,612,665 | 10/1952 | Scott | 20/69 |
| 2,657,438 | 11/1953 | Sparagen | 20/69 |
| 2,713,197 | 7/1955 | Schmidt | 29/432 |
| 2,720,685 | 10/1955 | Harris | 20/69 |
| 2,902,732 | 9/1959 | Beck et al. | 20/69 |
| 2,919,478 | 1/1960 | Sehn et al. | 20/69 |
| 3,071,826 | 1/1963 | Ziffer | 20/69 |
| 3,167,824 | 2/1965 | Berwanger | 20/69 |
| 3,171,165 | 3/1965 | Pryor | 20/69 |
| 3,213,494 | 10/1965 | Mayers | 20/69 |
| 3,216,758 | 11/1965 | Bohlen | 296/28 |
| 3,309,096 | 3/1967 | Inka | 24/662 |
| 3,411,245 | 11/1968 | Sturtevant | 49/492 |
| 3,545,798 | 12/1970 | Swett | 24/662 |
| 3,572,799 | 3/1971 | Truesdell | 293/1 |
| 4,270,792 | 6/1981 | Mathieson | 296/93 |
| 4,459,735 | 7/1984 | Sowdon | 29/509 |
| 4,574,453 | 3/1986 | Sowdon | 29/432 |
| 4,574,473 | 3/1986 | Sowdon | 29/798 |
| 4,730,416 | 3/1988 | Eames | 49/492 |

FOREIGN PATENT DOCUMENTS 2548742 7/1983 France .
1070547 10/1964 United Kingdom .

OTHER PUBLICATIONS

BTM Corp. Bulletin No. 60 "Clinching".

Primary Examiner—Robert R. Song
Attorney, Agent, or Firm—Steele, Gould & Fried

[57] ABSTRACT

An arrangement for mounting sealing strips on motor vehicles and the like comprises: at least one structural member of the vehicle having projecting rivets formed integrally from the member along a gap to be sealed; and, a sealing strip pressably affixed to the projecting rivets along the gap, obviating the need to provide separate studs or rivets for affixing the sealing strip. In a preferred method, at least two structural members of the vehicle are joined to one another by rivets formed integrally from one or both of the members and extending through one of the members, along the gap to be sealed.

20 Claims, 3 Drawing Sheets

MOUNTING ARRANGEMENT FOR SEALING STRIPS

BACKGROUND OF THE INVENTION

1. Field of the Invention

This invention relates to mounting arrangements for sealing strips in general, and in particular, to mounting arrangements for sealing strips for motor vehicles and the like.

2. Prior Art

It has been long accepted in the automobile industry that doors, trunk lids, hoods and the like for motor vehicles must be provided with weather seals or sealing strips. Such weather seals are necessary to enhance reliability and comfort. As might be imagined, the prior art is replete with different techniques utilized over the years to mount weather seals on motor vehicle doors. Some such weather seals are mounted on the vehicle bodies, some are mounted on the doors, and some are mounted on both. In each instance and variation, however, it has been necessary to provide separate and independent mounting means, often in the form of screws, rivets or specialized fasteners or through the use of flanges and flange-gripping structure. Even in those instances where sealing strips have been integrally formed with wire carriers, portions of which project from the sealing strip and are available for engagement with securing means, the securing means have been independently manufactured and attached, prior to affixation of the weather seal, or as part of the affixation process. This point is well illustrated in the following U.S. Pat. Nos.: 2,601,512-Gagnier; 2,607,965-Gagnier; 2,612,665-Scott; 2,657,438-Spraragen; 2,720,685-Harris; 2,902,732-Beck, et al; 2,919,478-Sehn, et al; 3,071,826-Ziffer; 3,167,824-Berwanger; 3,171,165-Pryor; 3,213,494-Mayers, et al; 3,411,245-Strutevant; 3,572,799-Truesdell, et al; and, 4,270,792-Mathieson, et al. British Pat. No. 1,070,547-Happich and French Pat. No. 2,548,742-Mesnel are also illustrative.

In a disparate art, a method of construction is known wherein overlapping surfaces of two members can be joined to one another with integrally formed rivets, often referred to as BTM buttons, rather than by separately manufactured and applied rivets, screws and the like, or by welding or similar procedures. Such "TOG-L-LOC" joints can be manufactured according to processes developed by BTM Corporation of Marysville, Mich. The processes and related equipment are described in U.S. Pat. Nos. 4,459,735; 4,574,453; and, 4,574,473. The teachings of these patents are incorporated by reference. Briefly, and by way of example, two layers are joined by a composite, extruded elongated rivet formed in and from both layers, and further extruded through an opening in one of the layers. The opening is formed by the extrusion process. Two or more metal sheets to be joined are first placed in overlapping or face-to-face relationship and thereupon placed into a press with the lower surface of the sheet metal assembly disposed on the surfaces of an appropriate die. As the press is actuated, the punch moves downwardly towards the sheet metal pieces and the die. Upon engagement of the die and the sheet metal, the sheet metal is caused to be drawn downwardly toward the upper surface of an anvil. There is no fracturing or shearing of the metal because of the provision a radius around the periphery of an opening in the die and the clearance between the opening and the punch. The drawing action results directly from the coaction of the punch and the opening. As the punch approaches the anvil at a distance less than the total combined original thickness of sheet metal pieces, there is a transverse or lateral extrusion of the metal, which results in the formation of a laterally enlarged shape, such as shown in FIG. 4 of this application, which defines a mechanical interlock between the sheet metal pieces. It will be appreciated by those skilled in the art that FIG. 4 of this application is not drawn fully to scale, but is intended to provide a representative illustration of the cross-section configuration of the metal forming the joint. The result is a strong, permanent and leak proof joint.

Although the form of the integrally formed rivet will vary with the punching and extruding technique which are utilized in each instance, the overall effect is essentially the same, namely the need for a separately formed rivet and performed holes is eliminated. Other integral rivet techniques are illustrated in the following U.S. Pat. Nos.: 1,252,289-Murray, Jr.; 2,713,197-Schmidt (construction of wheels); 3,216,758-Bohlen; and, 3,731,369-Johnson (post and sheet panel construction for trailer bodies).

Mounting arrangements for sealing strips according to this invention marry the teachings of these disparate arts, and for the first time, provide an assembly wherein weather seals can be affixed to doors for motor vehicles and the light without the need or expense of separately manufacturing and attaching independent fastening means to the door or door structure for receiving the weather seals. Instead, structural members for motor vehicles and the like according to this invention are formed with or joined by rivet means formed integrally from one of the members along a gap to be sealed and, in the case of joined members, extending through the other of the members, the rivet means projecting axially and then radially beyond the other of the members; and, a weather seal or sealing strip affixed to the rivet means. The invention provides an elegant solution to the problems of mounting sealing strips or weather seals on doors for motor vehicles and the like, and in so doing, eliminates the need for an entire assembly step; namely the attachment of independent means for attaching the sealing strip.

SUMMARY OF THE INVENTION

It is an object of this invention to provide an improved mounting arrangement for sealing strips on motor vehicles and the like.

It is another object of this invention to provide a mounting arrangement for sealing strips on motor vehicles and the like, which arrangement obviates the need to provide, by purchase or manufacture, separate means for mounting sealing strips and the like.

It is yet another object of this invention to provide a mounting arrangement for sealing strips on motor vehicles and the like, which mounting arrangement eliminates the manufacturing step of affixing a mounting means for the sealing strips and the like.

It is yet another object of this invention to provide a mounting arrangement for sealing strips on motor vehicles and the like, wherein integrally formed rivets can be utilized to secure members together, and at the same time, to secure sealing strips and the like.

These and other objects are accomplished by the mounting arrangement for sealing strips on motor vehicles and the like, the arrangement comprising: at least one structural member of the vehicle having projecting rivet means formed integrally from the member along the gap to be sealed; and, a sealing strip affixed to the projecting rivet means along the gap, obviating the need to provide separate attachment means for the sealing strip. In a preferred embodiment, at least two structural members of the vehicle are joined to one another by rivet means formed integrally from one of the members and extending through the other of the members, along the gap to be sealed, each of the integral rivet means projecting beyond the other member. The structural members of the vehicle may form part of the body and so defined some or all of the door opening, or the structural members may comprise panels forming all or part of the door itself.

These and other objects are also accomplished by a method for fixing a sealing strip in a motor vehicle and the like, comprising the steps of: providing at least one structural member of the vehicle with projecting rivet means formed integrally from the member along the gap to be sealed; and, affixing a sealing strip to the projecting rivet means along the gap, obviating the need to provide separate attachment means for the sealing strip. In a preferred embodiment, the method further comprises the step of riveting at least two structural members of the vehicle to one another by rivet means formed integrally from one of the members, along the gap to be sealed, each of the integral rivet means projecting beyond the other member. The method may also comprise either or both of the steps of: connecting at least some structural members defining the door opening for the vehicle body with the integrally rivet means, or connecting at least some structural members defining a door for the vehicle body with the integrally formed rivet means; and, securing a sealing strip for the vehicle door to the rivet means.

In both the mounting arrangement for sealing strips and the method for affixing sealing strips, the sealing strip preferably comprises an integrally formed mounting means for engagement with the rivet means. In one embodiment, the sealing strip comprises a plurality of resilient loop means along its length, each loop means pressably engaging one of the rivet means.

BRIEF DESCRIPTION OF THE DRAWINGS

There are shown in the drawings forms which are presently preferred; it being understood, however, that the invention is not limited to the precise arrangements and instrumentalities shown.

DETAILED DESCRIPTION OF THE PREFERRED EMBODIMENTS

Figure 1:
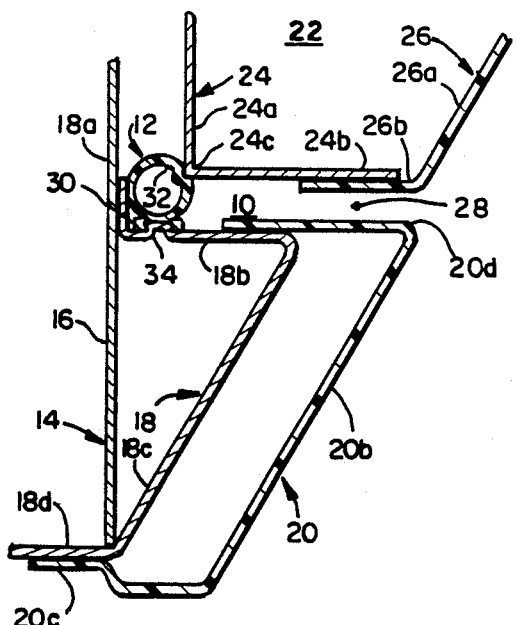
FIG. 1 is a section view through the lower portion of a door and door opening adjacent the rocker panel of a motor vehicle, the door opening being provided with a sealing strip mounted in accordance with a first embodiment of a mounting arrangement according to this invention.

A mounting arrangement 10 for a sealing strip 12 on motor vehicles and the like is illustrated in FIG. 1. FIG. 1 shows a section view through the lower portion 14 of a door and sill (rocker panel) assembly of a motor vehicle or the like. The portion of the door frame structure 14 includes an interior metal member 16, an interior metal sill member 18 and an exterior sill member 20, the exterior sill member 20 being made from a reinforced plastics material so as to resist corrosion. Inner sill member 18 comprises an upwardly directed flange portion 18a joined to structural member 16, a substantially horizontal step portion 18b, a diagonal portion 18c and a horizontal bottom section 18d. A bottom edge of structural member 16 fits in the bend separating portions 18c and 18d. Outer sill member 20 comprises an upper horizontal step portion 20a, a diagonal portion 20b and a lower horizontal flange 20c which engages horizontal portion 18d of inner sill 18. Members 16, 18 and 20 may be joined to one another by any number of various connection means, including but not limited to screws, rivets, welds and adhesives. In the embodiment of FIG. 1, the specific means utilized for joining these members forms no part of the invention and is not shown in detail.

The lower portion of a door assembly 22 comprises an inner metal panel 24 and an outer panel 26 made from reinforced plastics material. Inner and outer panel members 24 and 26 comprise substantially vertical portions 24a and 26a respectively and flange portions 24b and 26b respectively, the flange sections overlapping one another. Inner and outer panel members 24 and 26 may be joined to one another by any of the various means for joining described in connection with members 16, 18 and 20. It should be noted that the differences in coefficients of thermal and hydroscopic expansion between the metal and reinforced plastics part will likely need to be accommodated in the fastening means chosen.

Although the outer surfaces of portions 26a and 20b are so designed and positioned to form a continuous visual curve, the gap 28 between the bottom of the door and the top of the sill must nevertheless be sealed against the intrusion of air, water and moisture, noise and other debris and other contaminants. To this end, an elongated sealing strip is provided, the sealing strip 12 comprising a base 30 and a tubular or hollow sealing portion 32. The sealing strip may be constructed substantially in accordance with the teachings of European patent application No. 0 220 823 (commonly owned through subsidiary relationship), published June 5, 1987 and corresponding to U.S. Pat. No. 4,730,416. The sealing portion is so positioned as to be engaged by the corner 24c of the inner panel 24 of the door assembly 22.

Sealing strip 12 is affixed to the inner seal 18 by a plurality of rivet means 34 formed integrally from the very material of step portion 18b of inner sill 18. Such integrally formed rivet means may be manufactured according to the teachings of the BTM Corporation patents: 4,459,735; 4,574,453; and, 4,574,473. The sealing strips 12 may be secured as more fully explained in connection with FIGS. 4 and 5.

Figure 2:
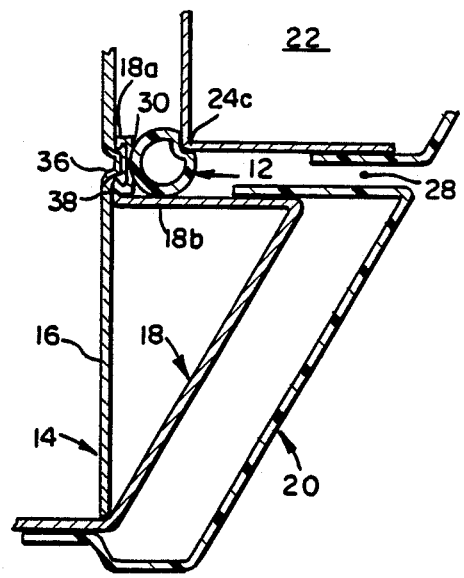
FIG. 2 is a section view similar to FIG. 1, but illustrating the door opening as constructed and adapted for a second embodiment of a mounting arrangement according to this invention.

An alternative mounting arrangement for the sealing strip 12 is shown in FIG. 2, wherein like numerals refer to like elements. Structural member 16, inner sill member 18 and outer sill member 20 form part of a door structure 14, being joined to one another by conventional means, except for the connection between upper flange 18a and member 16. Flange 18a and member 16 are joined to one another in this embodiment by integral rivet means 36, formed by the very material of structural member 16. Integral rivet means or button 36 is extruded through flange 18a and projects beyond the surface of flange 18a, so as to form means for anchoring the base portion 30 of sealing strip 12. In this embodiment, as in that of FIG. 1, the seal is effected between corner 24c of door assembly 22 and the tubular sealing portion 32 of sealing strip 12.

Figure 3:
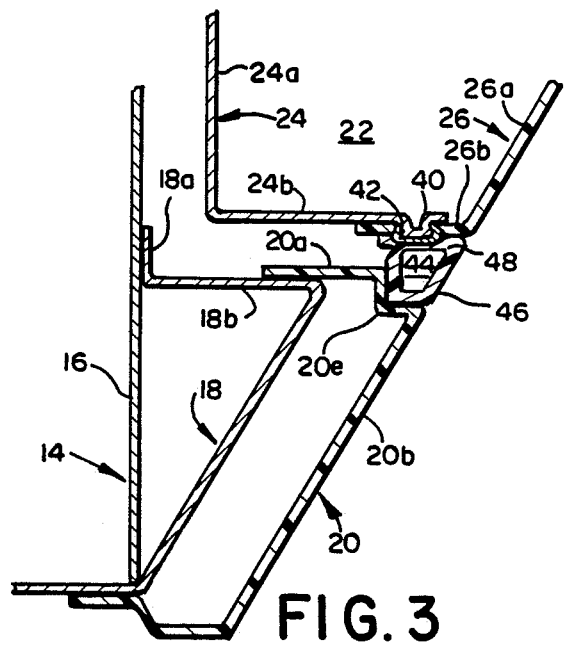
FIG. 3 is a view similar to FIGS. 1 and 2, but illustrating the door opening as adapted for a third embodiment of a mounting arrangement according to this invention.

A mounting arrangement for sealing strips utilizing integrally formed rivet means or BTM buttons is also applicable to the door structure, as well as the door frame structure, as illustrated in FIG. 3. Structural member 16, inner sill member 18 and outer sill member 20 are similar to those shown in FIG. 1, except that FIG. 3 shows an indented or recessed upper corner portion 20e, rather than an outwardly directed angular corner 20d as shown in FIG. 1. The door assembly 22 is similar to those of FIGS. 1 and 2, except that flange portions 24b and 26b of the inner and outer panel members 24 and 26 are connected to one another by rivet means 40 formed integrally from the very material of flange 24b. The integral rivet means or button 40 is extruded through a hole 42 punched in flange portion 26b by the extrusion process, and is expanded outwardly to form a means for anchoring a sealing strip 44, having a base portion 48 and a substantially trapezoidally shaped hollow or tubular sealing portion 46.

The embodiment of FIG. 3 is particularly desirable from an ornamental point of view insofar as the outer surfaces of panel portion 26a, outer sill portion 20b and sealing portion 46 not only provide a substantially visually continuous surface, but one which is in fact continuous. The mating portions of the tubular sealing portion 46 and the corner 20e of the outer sill member may be of another configuration, for example arcuate. The embodiment of FIG. 3 is also desirable insofar as sealing takes place at the outermost boundary of the gap 28.

Figure 4:
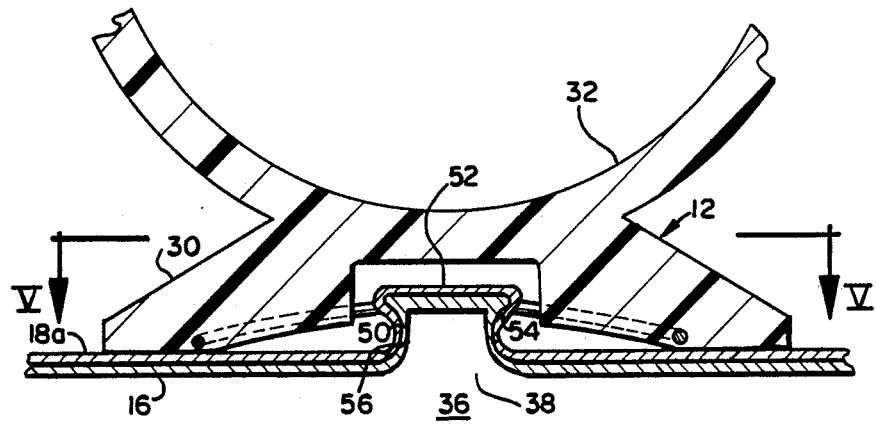
FIG. 4 is a partial section view taken along the line IV—IV, showing in enlarged scale a sealing strip having integrally formed mounting means affixed to an integrally formed rivet means, substantially in accordance with the embodiment of the invention shown in FIG. 2.
Figure 5:
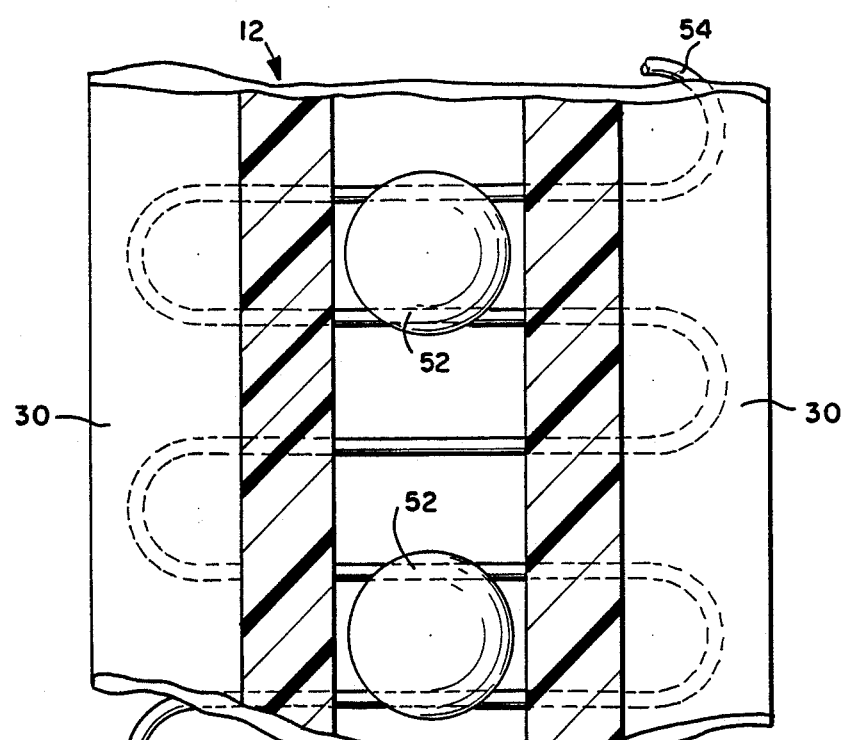
FIG. 5 is a section view taken along the line V—V in FIG. 4.

The presently preferred manner in which integrally formed rivet means or buttons can be used for anchoring sealing strips is illustrated in FIGS. 4 and 5, which correspond to the embodiment of FIG. 2. Integral rivet means or button 36 is used to join structural member 16 and flange 18a of inner sill member 18. The integral rivet means 36 is formed from the very material of structural member 16, which is punched through the material of flange 18a in a first extrusion process, punching its own hole 38 in the process. The integrally formed rivet means 36 has a stem portion 50 and a cap 52 which extends radially outwardly over stem portion 50. A thickened portion 56 helps lock flange 18a in place.

The sealing strip 12 is preferably formed with an integrally formed mounting means for engagement with the rivet means, for example wire carrier 54, which is formed into a plurality of resilient loop means along the length of sealing strip 12. The loop means pressably engage one of the rivet means 36, being slipped beneath the radially extended edge of the button portion 52. The length of the interval between adjacent rivet means and resilient loop means can be coordinated with one another for particular applications. The wire carrier 54 is preferably formed integrally with the sealing strip, during extrusion thereof.

Figure 6:
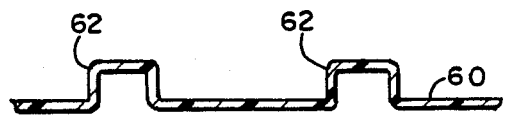
FIGS. 6 and 7 sequentially illustrate the formation of integral rivets from plastic material by heated dies.
Figure 7:

Integrally formed rivet means or buttons need not necessarily be formed in accordance with the teachings the BTM Corporation patents. Several alternative rivet means structures and methods are illustrated in FIGS. 6–14. FIG. 6 illustrates the formation of an appropriate rivet means from a flat plastic sheet section 60. Initially, a punch (not shown) having cylindrical projections is engaged in a die/punch operation which results in the formation of hollow, cylindrical projections 62. Depending upon the particular characteristics of the plastic, it may be necessary or desirable to heat the die, or the material, or both in order to achieve a fracture-free operation. Thereafter, as shown in FIG. 7, a die 64 may be provided with circular, rounded depressions 66, which have the effect of bending down the top of projections 62 and rolling them over, in order to form an annularly projecting rim 68.

Figure 8:
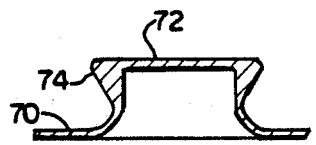
FIGS. 8 and 9 are section views through integrally formed metal and plastic rivets, respectively, each having a radially projecting circumferential lip.
Figure 9:
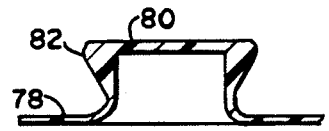

FIG. 8 illustrates in a scale larger than that of FIG. 1, an appropriate integrally formed rivet means 72 formed in a portion of flange 70, and having an annularly projecting rim 74. FIG. 9 illustrates an integrally formed rivet means 80 formed in a portion of flange 78, and having an annularly projecting rim 82. Each of the rivet means 72 and 80 shown in FIGS. 8 and 9 is suitable for use as the rivet means 34 shown in FIG. 1.

Figure 10:
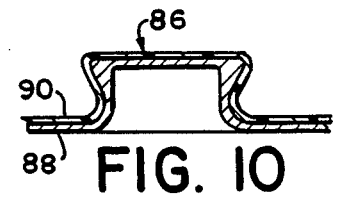
FIG. 10 is a section view through a metal-inside-plastic integral rivet joining metal and plastic lamina.
Figure 11:
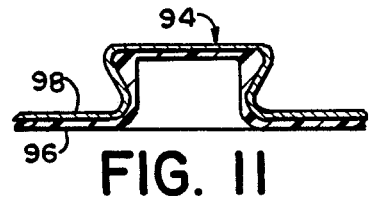
FIG. 11 is a section view through a plastic-inside-metal integral rivet joining plastic and metal lamina.

The invention is not limited necessarily to extruding metal through metal, metal through plastic, plastic through metal or plastic through plastic. Accordingly, FIG. 10 is a section view through a metal-inside-plastic integral rivet 86, formed by joining portions of a metal sheet, flange or lamina 88 and a plastic sheet, flange or lamina 90. On the other hand, FIG. 11 is a section view through a plastic-inside-metal integral rivet 94, formed by joining a plastic sheet, flange or lamina 96 and a metal sheet, flange or lamina 98.

Figure 12:
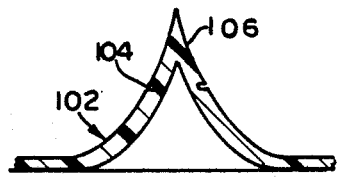
FIGS. 12 and 13 are section views through integrally formed plastic rivets having mounting grooves instead of a radially projecting circumferential lip; and, FIG. 14 is a section view of an integrally formed plastic rivet drawn through an opening in a metal sheet.
Figure 13:
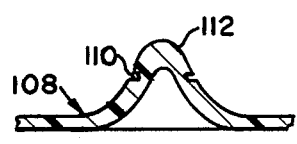

It is also possible to effect interengagement of integrally formed rivet means and an appropriate sealing strip without necessarily forming an annular, radially extending circumferential flange. Two such alternative, but substantially mechanically equivalent structures are shown in FIGS. 12 and 13. FIGS. 12 and 13 illustrate integrally formed rivet means 102 and 108 respectively. The rivet means are formed with circumferential grooves 104 and 110 respectively. In order to guide a wire carrier, for example, they are provided with contoured engagement surfaces 106 and 112 respectively. Contoured engagement surface 106 is a pointed cylindrical-like surface, whereas contoured engagement surface 112 is substantially semi-spherical.

Figure 14:
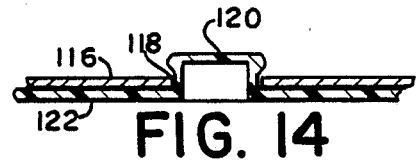

Finally, it will also be appreciated by those skilled in the art that the inherent characteristics of certain materials may make it impractical or impossible to punch and extrude a first material through a second material without first forming an opening of some sort in the second material. This might prove to be the case where a plastic material must be punched and/or extruded through a very hard material, for example, stainless steel. Accordingly, it is within the scope of this invention, as shown in FIG. 14, to form a first sheet 116 with an opening 118, through which an integrally formed rivet means 120 is extruded from underlying plastic sheet 122. This process is not necessarily limited to metal and plastic as shown, but is so illustrated merely to demonstrate the interaction of relatively very hard and very soft materials. The harder material may also be extruded through a preformed opening in the softer material.

It will be appreciated that this invention can be used wherever integrally formed rivet means can be substituted for conventional fastening means in gaps requiring sealing strips and the like to be mounted. The invention is substantially independent of the particular shape of the door frame and door structure with which it is utilized and is substantially independent of the particular shape and configuration of the sealing member. The invention may also be embodied in situations where metal surfaces are joined to one another and where metal and non-metal surfaces are joined to one another, it being possible to form rivet means integrally from either metal or plastics material. Moreover, it will also be appreciated that this invention can be utilized in environments other than sealing door openings in automobiles. Accordingly, this invention may be embodied in other specific forms without departing from the spirit or essential attributes thereof. Reference should be made to the appended claims, rather than to the foregoing specification, as indicating the true scope of the invention.

What is claimed is:

1. A mounting arrangement for sealing strips on motor vehicles and the like, the arrangement comprising:
    at least one structural member of the vehicle having projecting rivet means formed integrally from the member along a gap to be sealed; and,
    a sealing strip affixed to the projecting rivet means along the gap, obviating the need to provide separate attachment means for the sealing strip.

2. A mounting arrangement according to claim 1, comprising:
    at least two structural members of the vehicle joined to one another by rivet means formed integrally from at least one of the members and extending through the other of the members, along the gap to be sealed, the integral rivet means of the at least one member projecting beyond the other member.

3. A mounting arrangement according to claim 1, wherein the sealing strip comprises an integrally formed mounting means for engagement with the rivet means.

4. A mounting arrangement according to claim 2, wherein the sealing strip comprises an integrally formed mounting means for engagement with the rivet means.

5. A mounting arrangement according to claim 3, wherein the sealing strip comprises a plurality of resilient loop means along its length, at least some of the loop means pressably engaging one of the rivet means.

6. A mounting engagement according to claim 4, wherein the sealing strip comprises a plurality of resilient loop means along its length, at least some of the loop means pressably engaging one of the rivet means.

7. A mounting arrangement according to claim 2, wherein at least some structural members defining a door frame for the vehicle are joined by the integrally formed rivet means and a sealing strip for a vehicle door is affixed to the rivet means.

8. A mounting arrangement according to claim 2, wherein at least some structural members defining a door for the vehicle are joined by the integrally formed rivet means and a sealing strip for the vehicle door is affixed to the rivet means.

9. A mounting arrangement according to claim 2, wherein at least one of the rivet means is formed integrally from both of said members.

10. A mounting arrangement according to claim 2, wherein a plurality of rivet means are formed integrally from both of said members.

11. A method for affixing a sealing strip in a motor vehicle and the like, comprising the steps of:
    providing at least one structural member of the vehicle with projecting rivet means formed integrally from the member along a gap to be sealed; and,
    affixing a sealing strip to the projecting rivet means along the gap, obviating the need to provide separate attachment means for the sealing strip.

12. A method according to claim 11, comprising the step of riveting at least two structural members of the vehicle to one another by rivet means formed integrally from at least one of the members, along the gap to be sealed, the integral rivet means of the at least one member projecting beyond the other member.

13. A method according to claim 11, comprising the step of forming the sealing strip with an integrally formed mounting means for engagement with the rivet means.

14. A method according to claim 12, comprising the step of forming the sealing strip with an integrally formed mounting means for engagement with the rivet means.

15. A method according to claim 13, comprising the step of forming the sealing strip with a plurality of resilient loop means along its length, each loop means being capable of pressable engagement with one of the rivet means.

16. A method according to claim 14, comprising the step of forming the sealing strip with a plurality of resilient loop means along its length, each loop means being capable of pressable engagement with one of the rivet means.

17. A method according to claim 12, comprising the steps of:
    connecting at least some structural members defining a door frame for the vehicle body with the integrally formed rivet means; and,
    securing a sealing strip for a vehicle door to the rivet means.

18. A method according to claim 12, comprising the steps of:
    connecting at least some structural members defining a door for the vehicle body with the integrally formed rivet means; and,
    securing a sealing strip for the vehicle door to the rivet means.

19. A method according to claim 12, comprising the step of forming at least one of the rivet means integrally from both of the members.

20. A method according to claim 19, comprising the step of forming a plurality of the rivet means integrally from both of the members.

* * * * *